(12) United States Patent
Cron et al.

(10) Patent No.: US 10,202,488 B2
(45) Date of Patent: Feb. 12, 2019

(54) ISOCYANATE-FREE SYNTHESIS OF CARBONATE-MODIFIED POLYMERS

(71) Applicant: Evonik Degussa GmbH, Essen (DE)

(72) Inventors: Christina Cron, Velbert (DE); Gabriele Brenner, Dülmen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/541,752

(22) PCT Filed: Feb. 1, 2016

(86) PCT No.: PCT/EP2016/052025
§ 371 (c)(1),
(2) Date: Jul. 6, 2017

(87) PCT Pub. No.: WO2016/124518
PCT Pub. Date: Aug. 11, 2016

(65) Prior Publication Data
US 2017/0355814 A1    Dec. 14, 2017

(30) Foreign Application Priority Data

Feb. 5, 2015   (EP) .................................... 15153944

(51) Int. Cl.
| C08G 63/50 | (2006.01) |
| C08G 63/91 | (2006.01) |
| C08G 71/04 | (2006.01) |

(52) U.S. Cl.
CPC ........... *C08G 63/50* (2013.01); *C08G 63/916* (2013.01); *C08G 71/04* (2013.01)

(58) Field of Classification Search
USPC ....................................... 528/271, 272, 302
See application file for complete search history.

(56) References Cited

U.S. PATENT DOCUMENTS

| 8,053,522 | B2 | 11/2011 | Loehden et al. |
| 8,084,136 | B2 | 12/2011 | Loehden et al. |
| 8,118,968 | B2 | 2/2012 | Moeller et al. |
| 8,163,843 | B2 | 4/2012 | Brenner et al. |
| 8,383,728 | B2 | 2/2013 | Brenner et al. |
| 8,702,899 | B2 | 4/2014 | Spyrou et al. |
| 8,901,231 | B2 | 12/2014 | Brand et al. |
| 2007/0213465 | A1 | 9/2007 | Brand et al. |
| 2010/0105831 | A1 | 4/2010 | Brenner et al. |
| 2011/0082252 | A1 | 4/2011 | Koschabek et al. |
| 2015/0259470 | A1 | 9/2015 | Michaud et al. |
| 2016/0032045 | A1 | 2/2016 | Diehl et al. |

FOREIGN PATENT DOCUMENTS

| DE | 102007023867 A1 | 11/2008 |
| EP | 0328150 A2 | 8/1989 |
| JP | H06145264 | 5/1994 |
| WO | 2005090428 A1 | 9/2005 |
| WO | 2006010408 A1 | 2/2006 |
| WO | 2007098816 A2 | 9/2007 |
| WO | 2007098819 A1 | 9/2007 |
| WO | 2008090015 A1 | 7/2008 |
| WO | 2009010324 A2 | 1/2009 |
| WO | 2009021763 A1 | 2/2009 |
| WO | 2009095117 A1 | 8/2009 |
| WO | 2010006880 A1 | 1/2010 |
| WO | 2011073006 A1 | 6/2011 |
| WO | 2012007254 A1 | 1/2012 |
| WO | 2014068250 A1 | 5/2014 |
| WO | 2014139858 A1 | 9/2014 |
| WO | 2016034394 A1 | 3/2016 |
| WO | 2016124518 A1 | 8/2016 |
| WO | 2016139144 A1 | 9/2016 |
| WO | 2016139146 A1 | 9/2016 |
| WO | 2017001172 A1 | 1/2017 |

OTHER PUBLICATIONS

Brenner et al., U.S. Appl. No. 15/502,817, filed Feb. 9, 2017.
German language International Search Report dated Apr. 4, 2016 in PCT/EP2016/052025 (3 pages).
German language Written Opinion dated Apr. 4, 2016 in PCT/EP2016/052025 (5 pages).
International Search Report dated Apr. 4, 2016 in PCT/EP2016/052025 (2 pages).

*Primary Examiner* — Terressa Boykin
(74) *Attorney, Agent, or Firm* — Philip P. McCann; Nexsen Pruet, PLLC

(57) ABSTRACT

The present invention relates to an isocyanate-free and preferably solvent-free process for preparing polymers containing five-membered cyclic carbonate groups. In particular, the present invention is directed to a process for preparing polymers bearing cyclic carbonate groups by reacting carboxyl-bearing polymers selected from the group including polyesters based on di- or polyols and di- or polycarboxylic acids or derivatives thereof or poly(meth)acrylates, with hydroxyl-functionalized five-membered cyclic carbonates, without addition of isocyanates.

20 Claims, No Drawings

ISOCYANATE-FREE SYNTHESIS OF CARBONATE-MODIFIED POLYMERS

This application is a national stage application under 35 U.S.C. § 371 of International Application No. PCT/EP2016/052025 filed 1 Feb. 2016, which claims priority to EP Application No. 15153944.2 filed 5 Feb. 2015, the disclosures of which are expressly incorporated herein by reference.

FIELD

The present invention relates to an isocyanate-free and preferably solvent-free process for preparing polymers containing five-membered cyclic carbonate groups.

BACKGROUND

The polymer-analogous functionalization of polymer end groups to give five-membered cyclic carbonate groups is prior art. For instance, DE102007023867 describes the functionalization of the compounds containing amino groups with glycerol carbonate chloroformate. The formation of the amide groups proceeds quantitatively. However, the preparation of the acid chloride from glycerol carbonate constitutes an additional reaction step.

A further synthesis route is the reaction of 4-tosylmethyl-1,3-dioxolan-2-one with hydroxyl-terminated polymers, for example polyethers. Here too, it is not glycerol carbonate but a derivative which is used, the latter being prepared from glycerol carbonate beforehand.

The polymer-analogous reaction with commercially available, unmodified glycerol carbonate is described in EP328150. The free alcohol in the glycerol carbonate is reacted with anhydride groups in a polymer. However, polymers having anhydride groups, because of their high reactivity, are generally not obtainable during the reaction process but only after polymer-analogous reaction. This is especially true of polyamides and polyesters, which are synthesized by means of polycondensation.

The reaction of hydroxyl-terminated polymers with unsubstituted glycerol carbonate has likewise been described. They are joined to one another via diisocyanates, which react with the alcohol groups both of the polymer and of the glycerol carbonate to give the urethane. This can be effected via a reaction stage as described, for example, in JP 06145264 A, in which the polyols are mixed simultaneously with diisocyanate and glycerol carbonate. The disadvantage is that covalent joining of two polymers with a molecule of diisocyanate results in chain extensions.

An alternative, controlled process is a two-stage synthesis route first to give the isocyanate-terminated prepolymer which is then reacted with glycerol carbonate. WO 2006010408 describes this procedure for hydroxyl-terminated polyesters.

A disadvantage of the latter processes is that isocyanates are used. Isocyanates, especially non-polymer-bound isocyanates of low molecular weight, are a matter of toxicological concern. Therefore, complex occupational hygiene measures have to be taken in the course of production, and corresponding labelling of the product is required. In addition, it is necessary to ensure that, in the final use, the release of isocyanates into the breathable air or through migration is prevented.

The particular aim of using the carbonate-functionalized polymers in isocyanate-free polyurethane systems is to avoid isocyanates.

WO 2012007254 describes an isocyanate-free joining operation via a stoichiometric coupling with dicyclohexylcarbodiimide rather than diisocyanates, wherein the base polymers are prepared by ring-opening reaction. The polymerization reaction described can give only OH-terminated polymers which then have to be reacted with an anhydride in order to obtain the acid termination. For instance, the polyol first has to be reacted with succinic anhydride, for example. The resultant carboxyl end groups react in a second reaction step with glycerol carbonate. This is effected in dichloromethane with addition of activating reagents. Overall, this two-stage process is very complex and also cannot be conducted without solvent or catalytically.

SUMMARY

The problem addressed by the present invention is that of providing improved access to carbonate-modified polymers, which is performable in a very simple manner and ideally works without the use of isocyanates. This first problem is solved by processes according to the present invention.

DETAILED DESCRIPTION

Accordingly, the present invention first provides a process for preparing polymers bearing cyclic carbonate groups by reacting carboxyl-bearing polymers selected from the group comprising polyesters prepared by polycondensation reactions and based on di- or polyols and di- or polycarboxylic acids or derivatives or poly(meth)acrylates thereof with hydroxyl-functionalized five-membered cyclic carbonates, preferably glycerol carbonate (4-hydroxymethyl-1,3-dioxolan-2-one), without addition of isocyanates. Preference is given to conducting the reaction in the presence of a catalyst. Further preferably, the reaction is conducted without the use of further coupling reagents used in stoichiometric amounts.

The advantage of the process according to the invention is that it is an isocyanate-free and preferably solvent-free process, with which polyesters based on di- or polyols and di- or polycarboxylic acids or derivatives or poly(meth)acrylates thereof and bearing cyclic carbonate groups, especially five-membered carbonate groups, are obtained in a simple manner. Thus, the process of the present invention avoids the disadvantages of the prior art. Commercially available glycerol carbonate can be used without prior derivatization or purification. Moreover, no prior activation of the functional groups in the polymer, for example reaction with an anhydride, is required. Furthermore, no isocyanates are required for the synthesis. The use of the further coupling reagents used in stoichiometric amounts which is known from the prior art can advantageously also be dispensed with in the process according to the invention. It is a further advantage of the process according to the invention that, for example, COOH-terminated polyesters and COOH-containing poly(meth)acrylates can be modified together in a reaction with hydroxyl-functionalized five-membered cyclic carbonates.

The carboxyl group-bearing polymers used are polyesters based on di- or polyols and di- or polycarboxylic acids or derivatives or poly(meth)acrylates thereof.

Corresponding poly(meth)acrylates, i.e. polyacrylates or polymethacrylates, can be synthesized, for example, by free or controlled free-radical polymerization of acrylates or methacrylates, where at least one of the comonomers mentioned has a carboxyl functionality. This may, for example, be acrylic acid or methacrylic acid.

More preferably, the carboxyl-bearing polymers are polyesters based on di- or polyols and di- or polycarboxylic acids or derivatives thereof, which are in turn preferably synthesized by melt condensation from the di- or polyols and di- or polycarboxylic acids or derivatives thereof.

With regard to the di- or polyols and di- or polycarboxylic acids, there are no restrictions in principle, and it is possible in principle for any mixing ratios to occur. The selection is guided by the desired physical properties of the polyester. At room temperature, these may be solid and amorphous, liquid and amorphous or/and (semi)crystalline.

Di- or polycarboxylic acids used may be any organic acids which are known to those skilled in the art and contain two or more carboxyl functionalities. In the context of the present invention, carboxyl functionalities are also understood to mean derivatives thereof, for example esters or anhydrides.

The di- or polycarboxylic acids may especially be aromatic or saturated or unsaturated aliphatic or saturated or unsaturated cycloaliphatic di- or polycarboxylic acids. Preference is given to using bifunctional dicarboxylic acids.

Examples of suitable aromatic di- or polycarboxylic acids and derivatives thereof are compounds such as dimethyl terephthalate, terephthalic acid, isophthalic acid, naphthalenedicarboxylic acid and phthalic anhydride.

Examples of linear aliphatic di- or polycarboxylic acids include oxalic acid, dimethyl oxalate, malonic acid, dimethyl malonate, succinic acid, dimethyl succinate, glutaric acid, dimethyl glutarate, 3,3-dimethylglutaric acid, adipic acid, dimethyl adipate, pimelic acid, suberic acid, azelaic acid, dimethyl azelate, sebacic acid, dimethyl sebacate, undecanedicarboxylic acid, decane-1,10-dioic acid, dodecane-1,12-dioic acid, brassylic acid, tetradecane-1,14-dioic acid, hexadecanedioic acid, tridecanedioic acid, tetradecanedioic acid, octadecanedioic acid, dimer fatty acids and mixtures thereof.

Examples of unsaturated linear di- and/or polycarboxylic acids include itaconic acid, fumaric acid, maleic acid or maleic anhydride.

Examples of saturated cycloaliphatic di- and/or polycarboxylic acids include derivatives of cyclohexane-1,4-dicarboxylic acids, cyclohexane-1,3-dicarboxylic acids and cyclohexane-1,2-dicarboxylic acids.

It is possible in principle to use any desired diols or polyols for the preparation of the polyesters. Polyols are understood to mean compounds bearing preferably more than two hydroxyl groups. For instance, linear or branched aliphatic and/or cycloaliphatic and/or aromatic diols or polyols may be present.

Examples of suitable diols or polyols are ethylene glycol, propane-1,2-diol, propane-1,3-diol, butane-1,4-diol, butane-1,3-diol, butane-1,2-diol, butane-2,3-diol, pentane-1,5-diol, hexane-1,6-diol, octane-1,8-diol, nonane-1,9-diol, dodecane-1,12-diol, neopentyl glycol, butylethylpropane-1,3-diol, methylpropane-1,3-diol, methylpentanediols, cyclohexanedimethanols, tricyclo-[2.2.1]-decanedimethanol (dicidol), isomers of limonenedimethanol, isosorbitol, trimethylolpropane, glycerol, hexane-1,2,6-triol, pentaerythritol and mixtures thereof.

Aromatic diols or polyols are understood to mean reaction products of aromatic polyhydroxyl compounds, for example hydroquinone, bisphenol A, bisphenol F, dihydroxynaphthalene etc., with epoxides, for example ethylene oxide and propylene oxide. Diols or polyols present may also be ether diols, i.e. oligomers or polymers based, for example, on ethylene glycol, propylene glycol or butane-1,4-diol.

Polyols or polycarboxylic acids having more than two functional groups may be used as well, such as trimellitic anhydride, trimethylolpropane, pentaerythritol or glycerol, for example. Moreover, lactones and hydroxycarboxylic acids may be used as constituents of the polyester.

Preference is given to using bifunctional diols and dicarboxylic acids. Very particular preference is given in accordance with the invention to using aliphatic dicarboxylic acids and aliphatic diols.

The softening point of the carboxyl-bearing polymers is preferably ≤170° C., more preferably ≤150° C. The polymers are stable under inert conditions at ≤200° C. for at least 24 hours, meaning that they do not exhibit any significant change in the properties or any rise in color number.

It is essential that the polymers used bear carboxyl groups. Thus, the concentration of acid end groups, determined to DIN EN ISO 2114, is especially between 1 and 200 mg KOH/g, but preferably 10 to 100 mg KOH/g and must preferably 20 to 50 mg KOH/g.

The hydroxyl end groups, determined by titrimetric means to DIN 53240-2, may be any desired concentration, generally between 0 and 200 mg KOH/g, preferably between 0 and 10 mg KOH/g.

The number-average molecular weight of the carboxyl-bearing polymers used is generally 500-20 000 g/mol, preferably 1000-10 000 g/mol. The number-average molecular weight is determined in the context of the present invention to DIN 55672-1 by means of gel permeation chromatography in tetrahydrofuran as eluent and polystyrene for calibration.

In the simplest embodiment of the present invention, the carboxyl-bearing polymers are reacted with glycerol carbonate in the presence of a catalyst.

In a further and preferred embodiment of the process according to the invention, the preparation of the carboxyl-bearing polymers and the reaction with hydroxyl-functionalized five-membered cyclic carbonates, preferably glycerol carbonate, preferably in the presence of a catalyst, are combined with one another, so as to obtain a two-stage process. Accordingly, in the preferred variant of the process according to the invention, in a first reaction step, the carboxyl-bearing polyesters based on di- or polyols and di- or polycarboxylic acids or derivatives or poly(meth)acrylates thereof are prepared by polycondensation or polymerization, and the resultant carboxyl-bearing polymers are then reacted in a second reaction step with hydroxyl-functionalized five-membered cyclic carbonates, preferably glycerol carbonate, preferably in the presence of a catalyst.

The preparation of the carboxyl-bearing polymers, especially in the case of the polyesters based on di- or polyols and di- or polycarboxylic acids or derivatives thereof that are used with preference, in the first reaction step is preferably effected via a melt condensation. For this purpose, the aforementioned di- or polycarboxylic acids and di- or polyols are used in a molar ratio of carboxyl to hydroxyl groups of 0.8 to 1.5:1, preferably 1.0 to 1.3:1. An excess of carboxyl groups over hydroxyl groups is preferable in order to obtain a sufficient concentration of carboxyl groups in the polyester.

The polycondensation is effected at temperatures between 150 and 280° C. within 3 to 30 hours. First of all, a major part of the amount of water released is distilled off under atmospheric pressure. In the further course, the remaining water of reaction, and also volatile diols, are eliminated, until the target molecular weight is achieved. Optionally this may be made easier through reduced pressure, through an enlargement in the surface area, or by the passing of an inert gas stream through the reaction mixture. The reaction may additionally be accelerated by addition of an azeotrope former and/or of a catalyst before or during the reaction. Examples of suitable azeotrope formers are toluene and xylenes. Typical catalysts are organotitanium compounds such as tetrabutyl titanate. Also conceivable are catalysts based on other metals, such as tin, zinc or antimony, for example. Also possible are further additives and process aids such as antioxidants or color stabilizers.

In the second reaction step of the preferred embodiment of the process according to the invention, the resultant carboxyl-bearing polymers are reacted with hydroxyl-functionalized five-membered cyclic carbonates, preferably glycerol carbonate, preferably in the presence of a catalyst.

Examples of suitable hydroxyl-functionalized five-membered cyclic carbonates are 4-hydroxymethyl-1,3-dioxolan-2-one, 4-hydroxyethyl-1,3-dioxolan-2-one, 4-hydroxypropyl-1,3-dioxolan-2-one or sugar derivatives such as methyl-3,4-O-carbonyl-β-D-galactopyranoside, and 4-hydroxymethyl-1,3-dioxolan-2-one (glycerol carbonate) is especially preferred. Glycerol carbonate is commercially available and is obtained from glycerol wastes in biodiesel production.

The reaction with glycerol carbonate is effected at elevated temperatures, but below the breakdown temperature of the glycerol carbonate. At temperatures above 200° C., a rise in the hydroxyl group concentration is observed, probably as a result of partial ring opening of the glycerol carbonate with subsequent decarboxylation. This side reaction can be monitored via a rise in the hydroxyl number, determined by titrimetric means to DIN 53240-2. The rise in the hydroxyl number should be 0 to a maximum of 20 mg KOH/g, preferably 0 to a maximum of 10 mg KOH/g.

Therefore, the reaction is preferably effected at 100-200° C., more preferably at 140 to 200° C. and most preferably at temperatures around 180° C. The carboxyl-bearing polymer at this temperature is in liquid form or in the form of a viscous melt. Preferably, the synthesis is effected in substance without addition of solvent. Thus, the entire process according to the invention is preferably effected without the addition of solvent in the liquid phase or melt.

The carboxyl-bearing polymer is initially charged in a suitable reaction vessel, for example a stirred tank, and heated to the reaction temperature, and the hydroxyl-functionalized five-membered cyclic carbonate, preferably glycerol carbonate, and in the preferred embodiment the catalyst, are added. The water that forms during the reaction is removed continuously by means of a distillation apparatus. In order to facilitate the removal of water and to shift the equilibrium of the esterification reaction to the side of the modified product, the internal vessel pressure during the reaction is lowered stepwise from standard pressure to <100 mbar, preferably <50 mbar and more preferably <20 mbar. The course of the reaction is monitored via the concentration of free carboxyl groups, measured via the acid number. The reaction time is 2 to 20 hours. In general, no further purification of the polymer is required.

The amount of glycerol carbonate is guided by the concentration of carboxyl groups in the polymer. Preference is given to working under stoichiometric conditions or with a slight excess of glycerol carbonate. A relatively small excess of glycerol carbonate leads to much longer reaction times compared to higher excesses. However, if the excess of glycerol carbonate chosen is too high, unconverted glycerol carbonate remains in the product and can be separated from the reaction mixture only with great difficulty because of the high boiling point of glycerol carbonate. The glycerol carbonate excess is 0-50 mol %, preferably 0-10 mol % and most preferably 10 mol %, based on the molar amount of free carboxyl groups in the carboxyl-bearing polymer.

Under the reaction conditions described, the addition of a catalyst is preferable in order to achieve a sufficient reaction rate. In the absence of a catalyst, in general, no significant reduction in the carboxyl group concentration and only a slow chemical reaction are observed. Suitable catalysts are in principle substances which act as Lewis acids. Lewis bases, for example tertiary amines, do not show any catalytic reactivity.

However, titanium-containing Lewis acids which are frequently also used in melt condensations at high temperatures have a tendency to unwanted side reactions. It has been found that the addition of titanium salts and titanium organyls as catalysts leads to a distinct orange-brown color. Moreover, the catalytic activity is comparatively low. In contrast, titanium-free Lewis acids show a distinct acceleration of the reaction and at the same time have a tendency to only slight discoloration. Transparent to yellowish melts are obtained. The titanium-free Lewis acids used with preference include both nonmetallic Lewis acids, for example p-toluenesulphonic acid or methylsulphonic acid, but also titanium-free metallic Lewis acids, for example zinc salts. Particular preference is given to using tin-containing Lewis acids as catalyst. Suitable tin compounds are, for example, tin(II) octoate or, more preferably, monobutylstannoic acid. The amount of catalyst is preferably 1-10 000 ppm, more preferably 100-1000 ppm, based on the overall reaction mixture. It is also possible to use mixtures of different catalysts. In addition, it is possible to add the amount of catalyst in several individual portions.

In the course of performance of the second reaction step, it is possible to add further additives and color assistants such as antioxidants or color stabilizers. Corresponding components are known to those skilled in the art.

As a result of the process according to the invention, polymers containing five-membered cyclic carbonate groups are obtained. Accordingly, the present invention further provides polymers bearing cyclic carbonate groups, obtainable by the process according to the invention, where the polymers do not contain any isocyanates.

The resultant carbonate-functionalized polymers have an acid number, determined to DIN EN ISO 2114, of ≤10 mg KOH/g, preferably ≤5 mg KOH/g and more preferably ≤2 mg KOH/g. The concentration of hydroxyl end groups in the reaction solution, determined by titrimetric means to DIN 53240-2, rises during the reaction by a maximum of 20 mg KOH/g, preferably by a maximum of 10 mg KOH/g. It is preferably between 0 and 20 mg KOH/g.

Especially preferably, the inventive polymers are polyesters containing cyclic carbonate groups. The starting components usable for the polyesters, especially di- or polycarboxylic acids and di- or polyols, have been mentioned above.

The polymers obtained by the process according to the invention are suitable, for example, as binders in isocyanate-free polyurethane formulations. Accordingly, the present invention further provides for the use of the inventive polymers bearing cyclic carbonate groups in isocyanate-free polyurethane formulations.

The conversion is effected, for example, by the reaction of the cyclic carbonate groups with amines. The nucleophilic attack of the amine on the carbonyl atom of the cyclic carbonate results in a ring-opening reaction, forming a hydroxyurethane group. In this way, it is possible to avoid isocyanates that are harmful to health in polyurethane formulations. In relation to the amine compounds, there are no restrictions in principle. Preference is given, however, to using aliphatic polyamines having at least two amine functionalities. The reaction between cyclic carbonate groups and amine groups can optionally be accelerated by a catalyst. It is likewise possible for the formulation to contain further constituents, such as stabilizers, plasticizers, rheology modifiers, pigments or fillers.

The polyurethane formulations may find use, for example, in coating, adhesive and sealant formulations. In this context, the polymers obtained by the process according to the invention are suitable for use both in reactive one-component systems and in two-component systems. In the application of the formulation, adequate wetting of the substrate has to be assured. In the case of high-viscosity or solid polymers obtained by the process according to the invention, this can generally be achieved either by producing a solution or by increasing the temperature. The coating, adhesive and sealant formulations may be employed on different substrates. These include, for example, plastics, glass, paper, wood, stone and especially metals such as steel and aluminum.

Even in the absence of further information it is assumed that a person skilled in the art can make very extensive use of the above description. The preferred embodiments and examples are therefore to be interpreted merely as descriptive disclosure, and certainly not as disclosure that is in any way limiting.

The present invention is explained in more detail below with reference to examples. Alternative embodiments of the present invention are obtainable analogously.

EXAMPLES

Example 1 (Monobutylstannoic Acid at 180° C.; Inventive)

3000 g of adipic acid (20.5 mol) are melted together with 2290 g of hexane-1,6-diol (19.4 mol) in a flask with a distillation apparatus under nitrogen. At a temperature of 240° C., the majority of the water of reaction formed is distilled off within about four to six hours. Subsequently, 0.05% by weight of a titanium catalyst is added and the pressure in the apparatus is lowered stepwise down to 10 mbar. After attainment of a hydroxyl number of 0.9 mg KOH/g, measured to DIN 53240-2, and an acid number of 29 mg KOH/g, measured to DIN EN ISO 2114, the melt is cooled down to 180° C. 329 g (corresponding to 1.1 equivalents, based on the free carboxyl groups) of glycerol carbonate and 0.05 percent by weight of monobutylstannoic acid are added. After attainment of an acid number of ≤1 mg KOH/g after about 10 h, the reaction has ended. The resultant polyester P1 bearing carbonate groups has a hydroxyl number of 9.3 mg KOH/g, measured to DIN 53240-2, and an acid number of 0.7 mg KOH/g, measured to DIN EN ISO 2114. The hydroxyl number has risen by only 8.4 mg KOH/g during the modification with glycerol carbonate. It can be inferred from this that the ring opening of the glycerol carbonate with decarboxylation to give the glycerol derivative takes place only as a minor side reaction.

The obtaining of the five-membered cyclic carbonates can also be demonstrated via NMR spectroscopy. In the $^{13}$C NMR, the signal for the carbonyl carbon of the free glycerol carbonate at 155 ppm, as a result of covalent attachment to the polymer, moves to 154 ppm. The two other signals for the carbonate ring at 77 ppm (CH) and 66 ppm (CH$_2$) also undergo a high-field shift of about 1-3 ppm as a result of the attachment to the polymer.

Example 2 (Tin(II) Octoate at 180° C.; Inventive)

3000 g of adipic acid (20.5 mol) are melted together with 2290 g of hexane-1,6-diol (19.4 mol) in a flask with a distillation apparatus under nitrogen. At a temperature of 240° C., the majority of the water of reaction formed is distilled off within about four to six hours. Subsequently, 0.05% by weight of a titanium catalyst is added and the pressure in the apparatus is lowered stepwise down to 10 mbar. After attainment of a hydroxyl number of 1.7 mg KOH/g, measured to DIN 53240-2, and an acid number of 30 mg KOH/g, measured to DIN EN ISO 2114, the melt is cooled down to 180° C. 341 g (corresponding to 1.1 equivalents, based on the free carboxyl groups) of glycerol carbonate and 0.05 percent by weight of tin(II) octoate are added. After attainment of an acid number of ≤2 mg KOH/g after about 15 h, the reaction has ended. The resultant polyester P2 bearing carbonate groups has a hydroxyl number of 10.0 mg KOH/g, measured to DIN 53240-2, and an acid number of 1.8 mg KOH/g, measured to DIN EN ISO 2114. The hydroxyl number has risen by 8.3 mg KOH/g during the modification with glycerol carbonate.

Example 3 (No Catalyst at 180° C.; Non-inventive)

3000 g of adipic acid (20.5 mol) are melted together with 2290 g of hexane-1,6-diol (19.4 mol) in a flask with a distillation apparatus under nitrogen. At a temperature of 240° C., the majority of the water of reaction formed is distilled off within about four to six hours. Subsequently, 0.05% by weight of a titanium catalyst is added and the pressure in the apparatus is lowered stepwise down to 10 mbar. After attainment of a hydroxyl number of 1.7 mg KOH/g, measured to DIN 53240-2, and an acid number of 30 mg KOH/g, measured to DIN EN ISO 2114, the melt is cooled down to 180° C. 341 g (corresponding to 1.1 equivalents, based on the free carboxyl groups) of glycerol carbonate are added. No catalyst is added. Over a reaction time of 7 h, no significant decrease in the acid number or hydroxyl number is observed. The resultant polyester has a hydroxyl number of 26 mg KOH/g, measured to DIN 53240-2, and an acid number of 21 mg KOH/g, measured to DIN EN ISO 2114. No measurable conversion has taken place within the stated reaction time. The hydroxyl number has risen by 19.3 mg KOH/g during the reaction.

Example 4 (Titanium Catalyst, 180° C.; Inventive)

3000 g of adipic acid (20.5 mol) are melted together with 2290 g of hexane-1,6-diol (19.4 mol) in a flask with a distillation apparatus under nitrogen. At a temperature of 240° C., the majority of the water of reaction formed is distilled off within about four to six hours. Subsequently, 0.05% by weight of a titanium catalyst is added and the pressure in the apparatus is lowered stepwise down to 10 mbar. After attainment of a hydroxyl number of 1.7 mg KOH/g, measured to DIN 53240-2, and an acid number of 30 mg KOH/g, measured to DIN EN ISO 2114, the melt is cooled down to 180° C. 341 g (corresponding to 1.1 equivalents, based on the free carboxyl groups) of glycerol carbonate and 0.05 percent by weight of the catalyst already used in the melt condensation are added. As soon as the catalyst is added, the reaction melt changes color from orange to light brown; later on, a dark brown product is obtained. After attainment of an acid number of ≤2 mg KOH/g after about more than 18 h, the reaction has ended. The resultant polyester has a hydroxyl number of 24 mg KOH/g, measured to DIN 53240-2, and an acid number of 0.4 mg KOH/g, measured to DIN EN ISO 2114. The hydroxyl number has risen by 22.3 mg KOH/g during the modification with glycerol carbonate.

Example 5 (Monobutylstannoic Acid at 220° C.; Inventive)

3000 g of adipic acid (20.5 mol) are melted together with 2290 g of hexane-1,6-diol (19.4 mol) in a flask with a distillation apparatus under nitrogen. At a temperature of 240° C., the majority of the water of reaction formed is distilled off within about four to six hours. Subsequently, 0.05% by weight of a titanium catalyst is added and the pressure in the apparatus is lowered stepwise down to 10 mbar. After attainment of a hydroxyl number of 1.7 mg KOH/g, measured to DIN 53240-2, and an acid number of 30 mg KOH/g, measured to DIN EN ISO 2114, the melt is cooled down to 220° C. 341 g (corresponding to 1.1 equivalents, based on the free carboxyl groups) of glycerol carbonate and 0.05 percent by weight of monobutylstannoic acid are added. After attainment of an acid number of ≤2 mg KOH/g after 4.5 h, the reaction has ended. The resultant polyester has a hydroxyl number of 21 mg KOH/g, measured to DIN 53240-2, and an acid number of 0.4 mg KOH/g, measured to DIN EN ISO 2114. The comparatively high hydroxyl number indicates side reactions resulting from the thermal ring opening of the carbonate group. The hydroxyl number has risen by 19.3 mg KOH/g during the modification with glycerol carbonate.

Example 6 (Methylsulphonic Acid at 180° C.; Inventive)

3000 g of adipic acid (20.5 mol) are melted together with 2290 g of hexane-1,6-diol (19.4 mol) in a flask with a distillation apparatus under nitrogen. At a temperature of 240° C., within about four to six hours, the majority of the water of reaction formed is distilled off. Subsequently, the pressure in the apparatus is lowered stepwise down to 10 mbar. After attainment of a hydroxyl number of 4.4 mg KOH/g, measured to DIN 53240-2, and an acid number of 30 mg KOH/g, measured to DIN EN ISO 2114, the melt is cooled down to 180° C. 341 g (corresponding to 1.1 equivalents based on the free carboxyl groups) of glycerol carbonate and 0.2 percent by weight of methylsulphonic acid are added. The resultant polyester has a hydroxyl number of 9.3 mg KOH/g, measured to DIN 53240-2, and an acid number of 3.0 mg KOH/g, measured to DIN EN ISO 2114. The comparatively high acid number indicates incomplete conversion. The hydroxyl number has risen by 4.9 mg KOH/g during the modification with glycerol carbonate.

Example 7 (Zinc(II) Acetate at 220° C.; Inventive)

3000 g of adipic acid (20.5 mol) are melted together with 2290 g of hexane-1,6-diol (19.4 mol) in a flask with a distillation apparatus under nitrogen. At a temperature of 240° C., within about four to six hours, the majority of the water of reaction formed is distilled off. Subsequently, 0.05% by weight of a titanium catalyst is added and the pressure in the apparatus is lowered stepwise down to 10 mbar. After attainment of a hydroxyl number of 1.7 mg KOH/g, measured to DIN 53240-2, and an acid number of 30 mg KOH/g, measured to DIN EN ISO 2114, the melt is cooled down to 220° C. 341 g (corresponding to 1.1 equivalents based on the free carboxyl groups) of glycerol carbonate and 0.05 percent by weight of zinc(II) acetate are added. The resultant polyester has a hydroxyl number of 25 mg KOH/g, measured to DIN 53240-2, and an acid number of 6.7 mg KOH/g, measured to DIN EN ISO 2114. The comparatively high hydroxyl number indicates side reactions as a result of the thermal ring opening of the carbonate group. The hydroxyl number has risen by 23.7 mg KOH/g during the modification with glycerol carbonate.

Table 1 gives an overview of the parameters of the polyesters obtained

TABLE 1

Comparison of the example reactions for reaction of linear hexanediol adipates with 1.1 equivalents of glycerol carbonate to give COOH end groups

| Example | Catalyst (% by wt.) | Temperature (° C.) | OHN [mg KOH/g] | AN [mg KOH/g] |
|---|---|---|---|---|
| 1 | MBTS | 180 | 9.3 | 0.7 |
| 2 | Sn(Oct)$_2$ | 180 | 10 | 1.8 |
| 3 | — | 180 | 26 | 21 |
| 4 | Ti cat. | 180 | 24 | 0.4 |
| 5 | MBTS | 220 | 21 | 0.4 |
| 6 | Methylsulphonic acid | 180 | 9.3 | 3.0 |
| 7 | Zinc(II) acetate | 220 | 25 | 6.7 |

OHN = OH number
AN = acid number

Example 8 (Branched Polyester, Monobutyltin Acid at 180° C.; Inventive)

3000 g of adipic acid (20.5 mol) are melted together with 2200 g of hexane-1,6-diol (18.6 mol) and 80 g of 1,1,1-trimethylolpropane (0.6 mol) in a flask with a distillation apparatus under nitrogen. At a temperature of 240° C., within about four to six hours, the majority of the water of reaction formed is distilled off. Subsequently, 0.05% by weight of a titanium catalyst is added and the pressure in the apparatus is lowered stepwise down to 10 mbar. After attainment of a hydroxyl number of 1.5 mg KOH/g, measured to DIN 53240-2, and an acid number of 35 mg KOH/g, measured to DIN EN ISO 2114, the melt is cooled down to 180° C. 398 g (corresponding to 1.1 equivalents based on the free carboxyl groups) of glycerol carbonate (3.4 mol) and 0.05 percent by weight of monobutyltin acid are added. After attainment of an acid number of ≤2 mg KOH/g after 7 h, the reaction has ended. The resultant polyester has a hydroxyl number of 14 mg KOH/g, measured to DIN 53240-2, and an acid number of 0.3 mg KOH/g, measured to DIN EN ISO 2114. The hydroxyl number has risen by 12.5 mg KOH/g during the modification with glycerol carbonate. Molecular weight analysis of the product by means of GPC showed a mean molecular weight of $M_n$=4400 Da with a molecular weight distribution of PDI=6.8.

Example 9 (Branched Polyester, Zinc(II) Acetate at 180° C.; Inventive)

3000 g of adipic acid (20.5 mol) are melted together with 2200 g of hexane-1,6-diol (18.6 mol) and 80 g of 1,1,1-trimethylolpropane (0.6 mol) in a flask with a distillation apparatus under nitrogen. At a temperature of 240° C., within about four to six hours, the majority of the water of reaction formed is distilled off. Subsequently, 0.05% by weight of a titanium catalyst is added and the pressure in the apparatus is lowered stepwise down to 10 mbar. After attainment of a hydroxyl number of 1.5 mg KOH/g, measured to DIN 53240-2, and an acid number of 35 mg KOH/g, measured to DIN EN ISO 2114, the melt is cooled down to 180° C. 398 g (corresponding to 1.1 equivalents based on the free carboxyl groups) of glycerol carbonate (3.4 mol) and 0.1 percent by weight of zinc(II) acetate are added. After attainment of an acid number of ≤2 mg KOH/g after 8.5 h, the reaction has ended. The resultant polyester has a hydroxyl number of 22 mg KOH/g, measured to DIN 53240-2, and an acid number of 1.4 mg KOH/g, measured to DIN EN ISO 2114. The comparatively high hydroxyl number indicates a side reaction, probably crosslinking. The hydroxyl number has risen by 21.5 mg KOH/g during the modification with glycerol carbonate. Molecular weight analysis of the product by means of GPC showed a mean molecular weight of $M_n$=5000 Da with a molecular weight distribution of PDI=40.

Table 2 gives an overview of the parameters of the polyesters obtained.

TABLE 2

Comparison of the molecular weights and molecular weight distributions in the reaction of branched hexanediol adipates with 1.1 equivalents of glycerol carbonate to give COOH end groups with two different catalysts

| Example | Catalyst (% by wt.) | Temperature (° C.) | OHN | AN | Mn (Da) | PDI |
|---|---|---|---|---|---|---|
| 8 | MBTS | 180 | 14 | 0.3 | 4400 | 6.8 |
| 9 | Zn(II) acetate | 180 | 22 | 1.4 | 5000 | 40 |

It becomes clear from the abovementioned data, by virtue of the different molecular weight distribution, that the preferred use of tin catalysts leads to polymers having a better-defined structure which can be used advantageously.

Example 10 (Branched Aliphatic Polyester, MBTS at 180° C.; Inventive)

3200 g of adipic acid (21.9 mol) are melted together with 2050 g of neopentyl glycol (19.7 mol) and 80 g of 1,1,1-trimethylolpropane (0.6 mol) in a flask with a distillation apparatus under nitrogen. At a temperature of 240° C., within about four to six hours, the majority of the water of reaction formed is distilled off. Subsequently, 0.05% by weight of a titanium catalyst is added and the pressure in the apparatus is lowered stepwise down to 10 mbar. After attainment of a hydroxyl number of 0.6 mg KOH/g, measured to DIN 53240-2, and an acid number of 36 mg KOH/g, measured to DIN EN ISO 2114, the melt is cooled down to 180° C. 405 g (corresponding to 1.1 equivalents based on the free carboxyl groups) of glycerol carbonate (3.4 mol) and 0.05 percent by weight of MBTS are added. After attainment of an acid number of ≤2 mg KOH/g after 15 h, the reaction has ended. The resultant polyester has a hydroxyl number of 12 mg KOH/g, measured to DIN 53240-2, and an acid number of 0.9 mg KOH/g, measured to DIN EN ISO 2114. The hydroxyl number has risen by 11.4 mg KOH/g during the modification with glycerol carbonate. Molecular weight analysis of the product by means of GPC showed a mean molecular weight of $M_n$=4100 Da with a molecular weight distribution of PDI=4.2.

The invention claimed is:

1. A two-stage process for preparing polymers bearing five-membered cyclic carbonate groups by reacting carboxyl-bearing polymers selected from the group comprising polyesters based on di- or polyols and di- or polycarboxylic acids or derivatives thereof or poly(meth)acrylates, with hydroxyl-functionalized five-membered cyclic carbonates, without addition of isocyanates.

2. The process according to claim 1, wherein the reaction is conducted in the presence of a catalyst.

3. The process according to claim 2, wherein the catalyst is selected from titanium-free Lewis acids.

4. The process according to claim 2, wherein tin-containing Lewis acids are used as catalyst.

5. The process according to claim 1, wherein the hydroxyl-functionalized five-membered cyclic carbonate is glycerol carbonate.

6. The process according to claim 1, wherein, in a first reaction step, the carboxyl-bearing polymers are prepared by polycondensation or polymerization, and the resultant carboxyl-bearing polymers are then reacted in a second reaction step with hydroxyl-functionalized five-membered cyclic carbonates.

7. The process according to claim 6, wherein the carboxyl-bearing polymers are prepared in the first reaction step via a melt condensation.

8. The process according to claim 6, wherein the polycondensation is effected at temperatures between 150 and 280° C. within 3 to 30 hours.

9. The process according to claim 1, wherein the reaction is effected without solvent.

10. The polymers bearing cyclic carbonate groups and selected from the group comprising polyesters based on di- or polyols and di- or polycarboxylic acids or derivatives or poly(meth)acrylates thereof, obtained by a process according to claim 1, where the polymers do not contain any isocyanates.

11. An isocyanate-free polyurethane formulation comprising the polymers bearing cyclic carbonate groups according to claim 10.

12. The process according to claim 3, wherein tin-containing Lewis acids are used as catalyst.

13. The process according to claim 2, wherein the hydroxyl-functionalized five-membered cyclic carbonate is glycerol carbonate.

14. The process according to claim 2, wherein, in a first reaction step, the carboxyl-bearing polymers are prepared by polycondensation or polymerization, and the resultant carboxyl-bearing polymers are then reacted in a second reaction step with hydroxyl-functionalized five-membered cyclic carbonates.

15. The process according to claim 14, wherein the carboxyl-bearing polymers are prepared in the first reaction step via a melt condensation.

16. The process according to claim 7, wherein the polycondensation is effected at temperatures between 150 and 280° C. within 3 to 30 hours.

17. The polymers bearing cyclic carbonate groups and selected from the group comprising polyesters based on di- or polyols and di- or polycarboxylic acids or derivatives or poly(meth)acrylates thereof, obtainable by a process according to claim 1, where the polymers do not contain any isocyanates.

18. An isocyanate-free polyurethane formulation comprising the polymers bearing cyclic carbonate groups according to claim 17.

19. The polymers bearing cyclic carbonate groups and selected from the group comprising polyesters based on di- or polyols and di- or polycarboxylic acids or derivatives or poly(meth)acrylates thereof, obtained by a process according to claim 1, where the polymers do not contain any isocyanates.

20. An isocyanate-free polyurethane formulation comprising the polymers bearing cyclic carbonate groups according to claim 19.

\* \* \* \* \*